Feb. 2, 1954 H. R. MOULTON 2,667,645
MEANS FOR ATTACHMENT OF EYE MUSCLES TO IMPLANTS
Filed April 4, 1950

INVENTOR
HAROLD R. MOULTON
BY
Louis L. Gagnon
ATTORNEY

Patented Feb. 2, 1954

2,667,645

UNITED STATES PATENT OFFICE 2,667,645

MEANS FOR ATTACHMENT OF EYE MUSCLES TO IMPLANTS

Harold R. Moulton, Southbridge, Mass., assignor to American Optical Company, Southbridge, Mass., a voluntary association of Massachusetts Application April 4, 1950, Serial No. 153,810

5 Claims. (Cl. 3—13)

This invention relates to improvements in artificial eyes of the type embodying implants which are used as replacements for human eyes in instances where the eyes are enucleated and has particular reference to an improved implant and novel means and method of attaching the motive muscles of the enucleated eyes of said implants.

One of the principal objects of the invention is to provide novel means and method of a simple and efficient nature for attachment of the motive muscular structure of an enucleated human eye to the implant portion of an artificial eye used for replacing the enucleated eye.

Another object is to provide improved means for attaching the motive muscular structure of an enucleated human eye to an artificial eye wherein the muscles can be attached to the implant portion of an artificial eye without restriction as to location on the implant and wherein the length of the muscles can be controlled, each of which improved feature tends to assure a more efficient positioning of the implant in the socket as well as to provide a more natural appearance of the artificial eye during subsequent movement thereof.

Another object is to provide artificial eyes of the implant type with separate means for attaching the motive muscular structure of the enucleated eye to said implant, said means embodying clip members shaped to have portions for gripping said muscles and to have other portions interlocking with said implants to firmly secure the muscles with no exposed projections or points on the assembled implants which might engage and irritate the tissues within the eye socket of the individual.

Another object is to provide an implant of the above character having a layer of foraminous material thereon, and connecting means comprising a clip having a portion adapted to grippingly engage the muscle to be attached to the implant and having portions thereon adapted to automatically interlock with the foraminous material to securely connecting the muscle to the implant.

Another object is the provision of an implant with a ball portion having a layer of foraminous material thereon and connection means disposed within the material of said ball portion, and separate connecting means having a portion adapted to grippingly engage the muscle of the eye and having projections thereon adapted to extend through said foraminous material and to engage and interlock with said connection means of the ball portion to secure the muscle to the implant.

Another object is to provide improved means for attaching the muscular structure of an enucleated eye to an implant used for replacing the enucleated eye and having foraminous or net-like material thereon, wherein said means are in the form of separate metallic clips having a binder portion shaped to overlie a portion of the muscle and further having portions adapted to pierce the muscles and to interlock with said foraminous or net-like material to secure the muscles to the implant with little possibility of accidental detachment of the muscles therefrom.

Another object is to provide means of the above character for attaching the muscular structure of an enucleated eye to an implant wherein the clips are adapted to engage and interlock with openings formed in the ball portion of the implant or in inserts imbedded in said ball portion.

Still another object is to provide connecting clips of the above character for attaching the muscular structure of an enucleated eye to an implant, which clips are provided with end portions permanently imbedded in the material of the ball portion of the implant and central portions spaced from the surface of said ball portion, one clip being located at the point of connection of each of the rectus muscles, with the material of said clips being such that under pressure the central portions thereof can be urged into permanent intimate engagement with the muscles to clamp the same tightly against the foraminous or net-like material into which they may subsequently grow during healing and thus become more permanently attached.

Other objects and advantages of the invention will become apparent from the following description taken in connection with the accompanying drawing in which:

Fig. 8 is a fragmentary sectional view similar to

Figure 3:
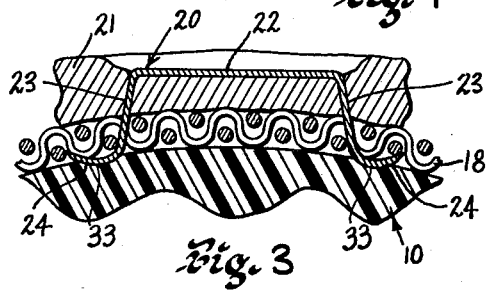
Fig. 3 is a fragmentary sectional view taken on line 3—3 of Fig. 1.
Figure 9:

Fig. 3 showing another modified form of clip and method of attaching muscles to implants; and Fig. 9 is a fragmentary sectional view showing a still further modification of clip and method of attaching muscles to implants.

The present invention is directed to the provision of an implant which may be used immediately subsequent to the enucleation of a human eye or may be implanted upon reopening the socket of an eye which has been previously removed. One of the major difficulties with prior art means and methods of inserting implants in the eye sockets of enucleated eyes was that it required considerable time, due mainly to the fact that the eye muscles were generally attached to the implants by suturing methods through the use of a very fine tantalum thread or the like, which thread in itself is extremely delicate and readily susceptible to breakage, and great care had to be exercised and considerable time was involved in properly positioning the muscles on the implant and attaching them thereto. Due to the fact that considerable time is required during such an operation, there is always present a constant danger of overtaxing the patient with possible consequent ill effects.

Another major difficulty was that of properly locating the implants in the eye sockets and of properly attaching the muscles thereto so that the final artificial eyes had a proper action of movement simulating that of the normal eyes.

Still another difficulty was that with some prior art methods of attaching the muscles to the implants there was a constant danger of having exposed sharp ends, points or projections existing after the implants were inserted and which might engage the tissues of the eye sockets and subsequently cause ill effects.

The present invention is directed particularly to the provision of exceedingly simple and efficient means and method whereby the prior art difficulties, time consuming and painstaking procedures employed in inserting an implant in the socket of an enucleated human eye are simplified and possible subsequent ill effects which might result from irritation are greatly reduced. This is accomplished through the provision of clip members which, subsequent to the severance of the muscles from the human eye, enucleation of the human eye, and insertion of the implant in the eye socket, are adapted to engage the muscles and become interlocked with portions of the implant to secure the muscles thereto.

A still further distinguishing feature of the present invention is the provision of an implant whereby the muscles may be attached thereto by separate clips, each of which can be quickly and easily made to grippingly engage a muscle and interlock with the implant in a single simple and efficient operation to secure the muscle to said implant with less danger of having existing sharp edges or points which may cause irritation subsequent to the operation.

Referring more particularly to the drawings wherein like characters of reference designate like parts throughout the several views, the artificial eye or implant embodying the present invention comprises broadly a ball portion 10 molded or otherwise formed to the size and shape desired and preferably formed of a translucent plastic material such as methyl methacrylate having white or other desired color pigments added thereto.

The frontal surface of the ball portion 10 is preferably provided with a short forwardly extending neck portion 11 of considerably smaller diameter than the main ball portion 10. The forward end of the neck portion 11 is shaped to be engaged by the rear surface of a main eye portion 13 when assembled therewith and is provided with an opening shaped to receive a rearwardly extending projection (not shown) on the rear surface of the main eye portion 13 for attachment therewith. The main eye portion 13 is made to resemble as closely as possible the visible portions of the eye to be replaced and includes an iris portion 14, a scleral portion 15 and a corneal portion 16, all formed of plastic material. The main eye portion 13 is preferably removable so that it may be cleansed, altered or replaced as desired.

The ball portion 10 of the implant is formed to the shape and size required by the individual and the surface of said ball portion 10 is provided with a circumferential groove 17 substantially centrally or slightly rearwardly of the central portion thereof. The groove 17 serves to receive the outer edge of a metallic wire mesh 18 formed preferably of columbian or tantalum metal and covering the portion of the surface area of the ball portion 10 between the neck portion 11 and groove 17. The inner edge of the mesh 18 is bound with a wire or other suitable means so that it will be disposed in encircling relation with the neck portion 11. The outer edge of the mesh 18 is suitably secured within the groove 17 by means of a circumferentially extending wire 19, the wire 19 being of a diameter closely approximating the width of the groove 17 and when forced into the groove to anchor the edge of the mesh therein it serves to draw the exposed surface of the mesh relatively taut and to retain the mesh in connected relation with the ball portion 10. It is to be understood, however, that other means may be employed for attaching the mesh to the ball portion, if desired.

Figure 1:
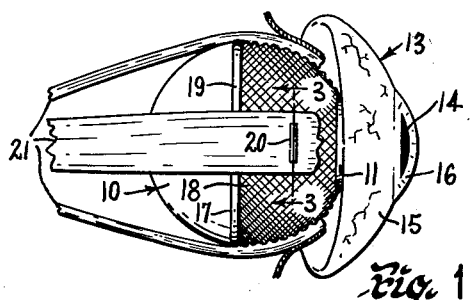
Fig. 1 is a side elevational view of an artificial eye having the muscular structure of a human eye attached thereto in accordance with this invention.
Figure 2:
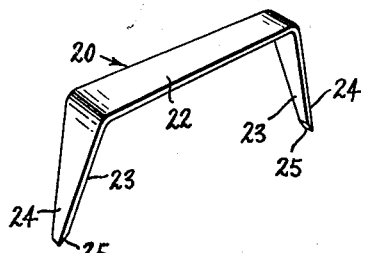
Fig. 2 is a perspective view of a clip embodying the invention.

When an individual's eye has been enucleated and a ball portion 10 of an implant of the above character has been inserted in the eye socket, the muscular structure of the eye is then attached to the ball portion 10 by means of clips 20, one clip 20 being provided for each of the four major rectus muscles 21. The clips 20 are preferably made of tantalum or other suitable metallic material which will not be affected by secretions or discharges of the eye and are each substantially U-shaped, the bight portions 22 (Fig. 2) thereof being adapted to engage the outer surfaces of the respective muscles 20, and the angularly projecting portions 23 being adapted to pierce the muscles and to interlock with the ball portion 10 or with the mesh 18 carried thereby.

A method employed in removing the eye of an individual and of replacing said eye with an implant constructed in accordance with the foregoing is broadly substantially as follows:

A cut is formed through the conjunctiva about the contour of the cornea of the eye to be removed. The conjunctiva is then rolled backwardly of the sclera to expose the rectus muscles 20. Each of the muscles 20 is securely gripped by suitable clamp means and is severed from the eye to be removed and retained in proper isolated position until the eyeball is removed from the socket. A suitable implant ball portion 10 is then inserted in the socket and the rectus muscles 20 are then respectively attached to the ball portion 10.

In attaching a muscle 20 it is first positioned as desired upon the mesh 18, it being necessary to carefully control the length of the muscle and tautness thereof. A clip 20 is brought into engagement with the muscle and the projections 23 made to pierce it by exerting a pressure thereon as shown in Fig. 3. As pressure is applied to the clip 20, the projections 23 will penetrate the mesh 18 and the ends thereof will contact the ball portion 10, whereupon, as pressure is continued, the inherent curvature of the ball portion 10 will cause the projections 23 to spread apart and thereby bend outwardly beneath the mesh 18. Thus, the end portions of each projection, as indicated by numeral 24 in Fig. 3, will, due to their engagement with the under surface of the mesh, prevent withdrawal of the clip 20 from its attached relation with the implant and cause the bight portion 22 to grip and hold the muscle in attached relation with the ball portion.

It has been found preferable to provide the clip 20 with projections 23 initially inclined slightly outwardly and having inner bevels 25 formed on the ends thereof, these features tending to insure proper spreading and bending of the projections 23 upon engagement with the ball portion 10. Since it is also preferable that only the end portions 24 of the projections 23 be made to bend or curl under the mesh 18, the projections 23 are formed with tapered sides to reduce the amount of material in the end portions 24, thereby facilitating the deformation of the projections in this area.

The clip 20 will preferably be inserted to a depth sufficient to depress the surface of the muscle 21 as shown in Fig. 3. This will aid in preventing the edges of the bight portion 22 from engaging the surrounding tissue of the eye and thereby possibly subsequently causing irritation thereof.

After the muscles have been properly attached to the implant, the eye tissues are relocated and the conjunctiva then drawn into encircling relation with the neck portion 11 by a purse-string suture or the like. Then the eye is allowed to heal and a main eye portion 13 is subsequently attached to the ball portion 10.

With such means as described above, the muscles 21 can be individually located as desired at the required points of attachment to the implant in accordance with the resultant characteristics desired. The time consumed is considerably reduced by elimination of the usual slow methods of suturing and improvement upon more recent methods of mechanically connecting the muscles results in greater assurance of proper and permanent connection to the implant with less chance of subsequent irritation. With the presently described arrangement, the attachment can be made with much greater ease and assurance of ultimate success as to proper location of the implant in the socket of the enucleated eye and with greater assurance that proper length control of the muscles is maintained so that the artificial eye may subsequently be moved in a manner more nearly simulating that of the normal eye.

With such a construction, it is evident that the eye muscles will, during the healing of the eye, tend to grow into and adhere to the mesh 18, as well as the tenons, conjunctiva and adjacent tissues.

Figure 6:
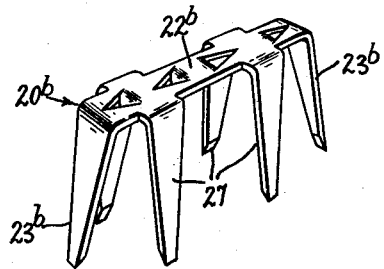
Fig. 6 is a perspective view of another modified form of clip.
Figure 4:
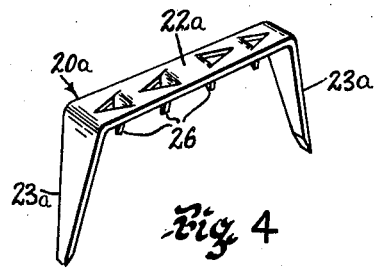
Fig. 4 is a perspective view of a modified form of clip.
Figure 7:
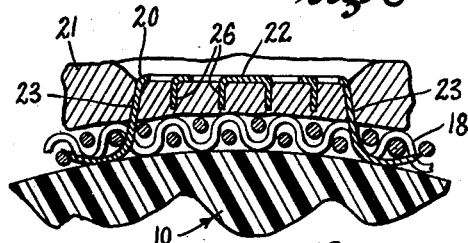
Fig. 7 is a fragmentary sectional view similar to Fig. 3 showing another method of attaching muscles.

It is to be understood that the clip may be made in several modified forms. As shown in Fig. 4, a clip 20a may be provided having a similar bight portion 22a and projections 23a, the bight portion 22a thereof being formed with a plurality of short pointed projections 26 struck inwardly of the clip out of the material thereof which are adapted to at least partially penetrate the muscles and thereby more positively assure their retention in located position on the implant. In Fig. 6 the bight portion 22b of clip 20b may also be provided with a plurality of integral projections 27 extending from the sides thereof, which projections are adapted to secure the muscles to the mesh 18 in a manner similar to the end projections 23b.

Figure 5:
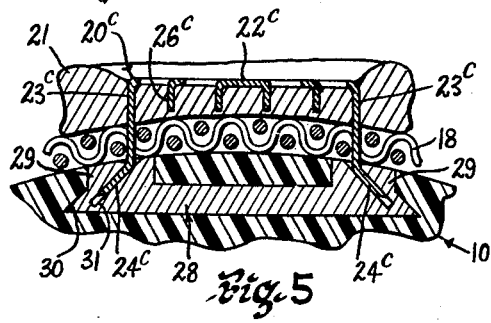
Fig. 5 is a fragmentary sectional view similar to Fig. 3 showing a modified method of attaching muscles to an implant.

A slightly modified means for retaining the end portions 24c of the projections 23c in desired relation with the ball portion 10 of the implant is disclosed in Fig. 5 wherein an insert 28 of substantially rigid metal or plastic material is embedded in the ball portion 10, preferably during the fabrication thereof, and positioned so as to have two spaced portions 29 flush with the outer surface of the ball portion 10. The insert 28 is preferably formed with a peripheral flange 30 therearound or other similar means to aid in anchoring the insert within the material of the ball portion 10. Each of the portions 29 is provided with an angled opening 31 therein in which the end portions 24c of the projections 23c are adapted to be urged, the mouth of each opening 31 preferably being slightly enlarged to assure that the projections 23c will be properly guided into the openings 31. With this construction the angle, or curvature if desired, of the openings 31 will tend to deform the end portions 24c of the projections 23c when pressure is applied to the clip 20c in attaching a muscle to an implant, which end portions 24c will conform to the shape of the openings 31, and thus the clip will become securely attached to the implant.

Figure 8:
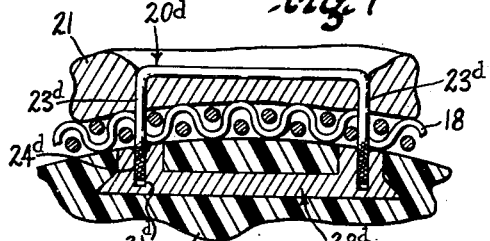

It is not desired to restrict the clip to a substantially initially flat shape and described hereinbefore, and Fig. 8 illustrates a clip 20d which is made of round stock. The said clips, however, may be formed to have a circular, oblong, square, oval or any other desired cross-sectional shape. The end portions 24d of the projections 23d may be formed with irregular surfaces, as shown in Fig. 8, whereby when pressure is applied to the clip 20d when attaching a muscle the end portions 24d may be forced inwardly of the openings 31d in the insert 28d and become wedged and frictionally held therein by the surface irregularities thereof.

In some instances it may be desirable to attach a muscle 21 by a clip 20e which is shaped to straddle the muscle as illustrated in Fig. 9. With such a construction the clip 20e is initially formed to the desired size and preferably prelocated on the ball portion 10. This may be done by anchoring the end portions 24e of the projections 23e thereof in the material of the ball portion 10, the end portions 24e being preferably kinked, fluted, or otherwise shaped so that they will not be easily withdrawn.

The bight portion 22e of the clip 20e is initially spaced at a sufficient distance away from the mesh 18 to permit a muscle to be inserted therebetween, as shown in dotted outline in Fig. 9, and is preferably provided with a plurality of pointed projections 32 extending in a direction toward the ball portion 10 or the inner surface may be corrugated or otherwise roughened to aid in gripping the muscle. With this construction a muscle 21 is inserted beneath the bight portion 22e of the clip and drawn therethrough in accordance with the desired length and tautness and then pressure is applied to the bight portion 22e to cause it to be pressed, with the projections 32, into the muscle 21 and thereby clamp the muscle against the mesh 18. The clip then will be deformed to substantially the shape shown by solid lines in Fig. 9 wherein the exposed portions of the projections 23e will be spaced from the sides of the muscle 21.

It is to be understood that the ball portion 10 of the implant may be provided with shallow recesses 33, as illustrated in Fig. 3, the recesses 33 being provided with curved surfaces so that the ends of the projecting portions 23 upon engaging the recesses 33 will be deflected outwardly in the manner described hereinbefore and become interlocked with the mesh 18. Although the recesses 33 are shown only in the modification illustrated by Fig. 3, modifications utilizing the clips shown in Figs. 4 and 6 can be provided with them, if desired.

With means in accordance with the foregoing description for securing an artificial eye within the socket of an enucleated human eye, it is evident that a mechanical dispenser may be used for carrying the clips 20 and inserting them when desired in the manner of stapling devices, thereby aiding a surgeon still further in improving upon the time element by eliminating the necessity of handling the individual clips with possible consequent time-consuming fumbling.

It is further to be understood that if desired the projecting portions 23 can be deflected inwardly toward one another by recesses formed in the ball portion 10, rather than outwardly as described; also that the ends 25 of the projecting portions 23 can be rounded rather than wedge shaped.

From the foregoing it will be seen that all of the objects and advantages of the invention have been accomplished through the provision of means of simple and efficient nature for attaching the muscular structure of an enucleated human eye to an artificial eye used for replacement of the enucleated eye, wherein the muscles can be attached at desired points in accordance with the characteristics of the particular individual being fitted, length of the muscles can be controlled, and the artificial eye is more efficiently anchored in position in the socket with little chance of accidental detachment and with less possibility of irritation of the flesh of the eye socket caused by exposed edges or points on the devices used for connecting the muscular structure of the eye to the artificial eye, all resulting in a more natural appearance of the artificial eye during subsequent movement thereof.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. In a device of the character described, an artificial eye for replacement of an eye of an individual comprising an implant embodying a ball portion of substantially globular shape having a layer of foraminous material superimposed thereupon and a substantially rigid member carried by said ball portion, said rigid member having a plurality of openings therein, and separate means for attachment of the muscular structure of the eye to said implant comprising a substantially U-shaped clip member formed of pliable material, the bight portion thereof being initially movable toward the rigid member to overlyingly grip said muscular structure with the projecting portions thereof piercing said muscular structure and said foraminous material and being located within the openings in said rigid member whereupon they will be retained within said openings to securely attach the muscle to said implant.

2. An implant member for insertion in the eye socket of a human being and adapted to be attached to the muscular structure of the eye, said implant member comprising a ball-shaped portion and provided with a plurality of substantially U-shaped clip-like portions each having a main part to overlie the end of an eye muscle and inwardly turned prong-like projections adjacent opposed sides thereof, said ball-shaped portion having means receiving the ends of said prong-like projections and maintaining said clip-like portions in assembled relation therewith, and said main part of the clip-like portions being initially free to move toward the surface of the ball-shaped portion whereby the muscular structure position therebetween may be intimately gripped thereby and held in attached relation with the implant when the prong-like projections are connected to said means of the ball portion.

3. An implant member for insertion in the eye socket of a human being and adapted to be attached to the eye muscles, said implant member comprising a ball-shaped portion, and having a plurality of substantially U-shaped clip-like portions each having a main part provided with means on its inner surface to overlie and engage in the end of an eye muscle and having inwardly turned prong-like projections for attachment with said ball-shaped portion, said main part being initially movable toward the surface of the ball-shaped portion to intimately grip a muscle positioned between it and the ball-shaped portion, and the ball-shaped portion having means receiving the ends of said prong-like projections and maintaining said clip-like portions in assembled relation therewith.

4. An implant member for insertion in the eye socket of a human being and adapted to be attached to the muscular structure of the eye, said implant comprising a ball-shaped portion having interconnection means carried thereby, and a clip-like member having a bar-like portion shaped to overlie the major portion of a muscle to be attached, said clip-like member having prong-like portions which extend through said muscle and interconnect with the interconnection means of the ball-shaped portion in such a manner as to permit the relative distance between the bar-like portion of the clip-like member and the adjacent surface of the ball-shaped portion to be altered, said bar-like portion being movable into compressing binding relation with the muscle, and said prong-like portions and interconnection means of the ball-shaped portion being adapted to retain said bar-like portion in said adjusted position relative to said ball-shaped portion of the implant member when in connected relation with said interconnection means.

5. A device for insertion in the eye socket of an individual from which an eye has been removed comprising an implant member having a substantially rigid perforated insert embedded within the material thereof and a substantially U-shaped clip member of pliable material having a bight portion to overlie and compress a part of said muscular structure against the implant member when positioned therebetween, the end portions of said clip member being forced within the perforations of said rigid insert so as to be retained in connected relation therewith.

HAROLD R. MOULTON.

References Cited in the file of this patent

UNITED STATES PATENTS

| Number | Name | Date |
|---|---|---|
| 2,430,853 | Barger | Nov. 18, 1947 |
| 2,629,877 | Jardon et al. | Mar. 3, 1953 |

FOREIGN PATENTS

| Number | Country | Date |
|---|---|---|
| 36,595 | Holland | Oct. 15, 1935 |

OTHER REFERENCES

American Journal of Ophthalmology, vol. 32, #2, February 1949, page 253, "A Universal Type Integrated Implant," by N. L. Cutler.